(12) United States Patent
Yasuda

(10) Patent No.: US 12,032,348 B2
(45) Date of Patent: Jul. 9, 2024

(54) FISHING REEL AND HISTORY DATA MANAGEMENT SYSTEM EQUIPPED WITH THE REEL

(71) Applicant: GLOBERIDE, Inc., Higashi Kurume (JP)

(72) Inventor: Hiromu Yasuda, Higashi Kurume (JP)

(73) Assignee: GLOBERIDE, INC., Tokyo (JP)

( * ) Notice: Subject to any disclaimer, the term of this patent is extended or adjusted under 35 U.S.C. 154(b) by 760 days.

(21) Appl. No.: 17/161,289

(22) Filed: Jan. 28, 2021

(65) Prior Publication Data

US 2021/0298284 A1 Sep. 30, 2021

(30) Foreign Application Priority Data

Mar. 24, 2020 (JP) .................................. 2020-052045

(51) Int. Cl.
*A01K 89/01* (2006.01)
*A01K 89/017* (2006.01)
*A01K 89/033* (2006.01)
*G05B 19/042* (2006.01)
*A01K 89/0155* (2006.01)

(52) U.S. Cl.
CPC ........ *G05B 19/0428* (2013.01); *A01K 89/017* (2013.01); *A01K 89/033* (2013.01); *A01K 89/0155* (2013.01); *G05B 2219/24024* (2013.01)

(58) Field of Classification Search
CPC .............. A01K 89/0155; A01K 89/017; A01K 89/033; A01K 89/00; A01K 97/125; H04B 1/3827; G05B 15/02
See application file for complete search history.

(56) References Cited

U.S. PATENT DOCUMENTS

| 6,412,722 | B1* | 7/2002 | Kreuser ........... A01K 89/01555 242/288 |
| 10,039,272 | B2* | 8/2018 | Komemushi .... A01K 89/01555 |
| 10,638,741 | B2* | 5/2020 | Kitano ............. A01K 89/01555 |
| 2014/0358483 | A1 | 12/2014 | da Rosa |

(Continued)

FOREIGN PATENT DOCUMENTS

| JP | H0398524 A | * | 4/1991 |
| JP | H11332436 A | | 12/1999 |
| JP | 2000-217478 A | | 8/2000 |

(Continued)

OTHER PUBLICATIONS

Chinese Office Action for related Chinese Application No. 202110109006.2; action dated Jun. 22, 2022; (19 pages).

(Continued)

*Primary Examiner* — Emmanuel M Marcelo
(74) *Attorney, Agent, or Firm* — Oliff PLC

(57) ABSTRACT

A fishing reel includes a spool that winds a fishing line; an operation portion that rotates the spool; a clutch that switches from being power transmissible to power non-transmissible and vice versa between the operation portion and the spool; a rotation detector that detects the rotation of the spool; a casting preparation commencement detector that detects casting is ready; a casting completion detector that detects completion of casting; a history data generator that generates history data from when casting is ready to when the casting is completed; and a storage that stores the history data.

14 Claims, 6 Drawing Sheets

(56) References Cited

U.S. PATENT DOCUMENTS

2017/0172130 A1* 6/2017 Komemushi .... A01K 89/01557
2017/0208785 A1* 7/2017 Ishikawa ............ A01K 89/0155

FOREIGN PATENT DOCUMENTS

JP          2003-310117 A     11/2003
JP           2009022222 A  *   2/2009

OTHER PUBLICATIONS

Office Action for related Japanese Patent Application No. 2020-052045; action dated Jun. 27, 2023; (4 pages).
Korean Office Action in connection with Korean Patent Application No. 10-2020-0165705; action mailed on May 27, 2023; (11 pages).
Extended European Search Report for related European Application No. 21153501.8; action dated Jul. 21, 2021; (10 pages).
Office Action for related Japanese Patent Application No. 2020-052045; action dated Jan. 24, 2023; (8 pages).
Nov. 28, 2023 Office Action issued in Korean Patent Application No. 10-2020-0165705.
May 21, 2024 Office Action issued in Japanese Application 2023-047435.

* cited by examiner

FISHING REEL AND HISTORY DATA MANAGEMENT SYSTEM EQUIPPED WITH THE REEL

TECHNICAL FIELD

This disclosure relates to a fishing reel having means capable of managing changes in spool speed and braking force during casting and retrieval, and a history data management system including the same.

BACKGROUND

Conventionally, various types of fishing reels are known that can adjust the braking of spools to improve users' casting method and increase the catch.

As such fishing reels, for example, Japanese Patent Application Publication No. 2000-217478 discloses a double-bearing fishing reel including: a generator composed of a coil and a magnet; a high-speed switch connected to the generator; a rotation speed detecting device for the spool; and a signal processing device that calculates the change rate of the spool rotation speed to command short-circuiting or opening of the high-speed switch; wherein the generator is composed of a coil provided on the reel body and a magnet that is fixed to the spool and rotates integrally with the spool around the outer periphery of the coil.

Further, an electric reel is known for which maintenance can be performed based on each reel information immediately upon the occurrence of a failure. As such electric reels, Japanese Patent Application Publication No. 2003-310117 discloses an electric reel mounted on a fishing rod including: a reel body attached to the fishing rod; a spool for winding a fishing line that is rotatably attached to the reel body; a motor that rotatably drives the spool; a motor control means that controls the motor; a diagnostic information storage means that stores control information related to the motor control means and diagnostic information for diagnosing the electric reel including various history information; and a communication means that can communicate the diagnostic information stored in the diagnostic information storage means to an external device.

However, in the configuration according to Japanese Patent Application Publication No. 2000-217478, although the braking force of the spool can be added based on the target value of the tension from the fishing line, it is difficult for the user to understand various elements for considerations such as the spool speed, temporal changes in the braking force, and the flight distance and the maximum speed of the fishing line. This therefore causes a problem that it is practically difficult to make an adjustment to the optimum braking force, and unnecessary braking force significantly reduces the flight distance of a rig, which may also hinder the improvement of users' casting method and affect the increase in the catch.

Further, in the configuration according to Japanese Patent Application Publication No. 2003-310117, although the control information related to the motor control means and the diagnostic information for diagnosing the electric reel including various history information can be stored, there is a problem that such information is just to perform maintenance in the event of the occurrence of an issue, which does not lead to the improvement of users' casting method and the increase in the catch.

It could therefore be helpful to provide a fishing reel that can refer to various history data upon casting and retrieval to improve users' casting method and increase the catch.

SUMMARY

I thus provide:

A fishing reel is configured to include: a spool that winds a fishing line; an operation portion that rotates the spool; a clutch that switches from being power transmissible to power non-transmissible and vice versa between the operation portion and the spool; a rotation detector (rotation detecting unit or rotation detecting portion) that detects the rotation of the spool; a casting preparation commencement detector (casting preparation commencement detecting unit or casting preparation commencement detecting portion) that detects that casting is ready; a casting completion detector (casting completion detecting unit or casting completion detecting portion) that detects the completion of casting; a history data generator (history data generating unit or history data generating portion) that generates history data from when casting is ready to when the casting is completed; and a storage (storing unit or storing portion) that stores the history data.

The casting preparation commencement detector may be configured to detect the commencement of casting preparation when the clutch is turned off, when the spool starts rotating in the fishing line unwinding direction from a standstill, when the reel is in a predetermined direction, or when the angular velocity in the predetermined direction of the reel is equal to or greater than a set threshold.

The casting completion detector may be configured to detect the completion of casting when the clutch is turned on, when a predetermined time elapses after the detection of the commencement of casting preparation, when the spool rotates in a winding direction, or when the rotation speed of the spool is equal to or less than a threshold.

The history data may be configured to include at least one of the rotation amount of the spool, temporal changes in the braking force to the spool, the casting distance of the fishing line, the maximum speed of the fishing line, the daily casting history, and the reel usage history.

The daily casting history may be configured to include at least one of the number of times of casting, the total casting distance, and the maximum casting distance.

The reel usage history may be configured to include at least one of the number of times of casting, the total casting distance, and the total number of rotations upon casting.

A fishing reel includes a braking force control means for changing the braking force to the spool over time, wherein the history data is configured to include temporal changes in the braking force.

A fishing reel is configured to include: a spool that winds a fishing line; an operation portion that rotates the spool; a rotation detector that detects the rotation of the spool; a casting completion detector that detects the completion of casting; a fishing line retrieval detector (fishing line retrieval detecting unit or fishing line retrieval detecting portion) that detects the retrieval of the fishing line; a history data generator that generates history data from the completion of casting to the retrieval of the fishing line; and a storage that stores the history data.

The fishing line retrieval detector may be configured to detect the retrieval of the fishing line when the winding of the fishing line on the spool is completed, when a predetermined time elapses after the detection of the completion of casting, or when the commencement of casting preparation is detected.

A fishing reel is configured to include an output portion that displays the history data. Further, the fishing reel may be configured to include a transmitter (transmitting unit or transmitting portion) that transmits the history data.

A history data management system includes any one of the above-mentioned fishing reels, a receiving means for receiving the history data, and an information processing device having an output portion that outputs the history data.

The information processing device may be configured to include an output portion that outputs the history data. Further, in the history data management system, the information processing device is a portable device.

Making various history data upon casting and retrieval referable at any time thus allows improvement of users' casting method and increase of the catch.

DESCRIPTION OF THE NUMERICAL REFERENCES

Figure 1:
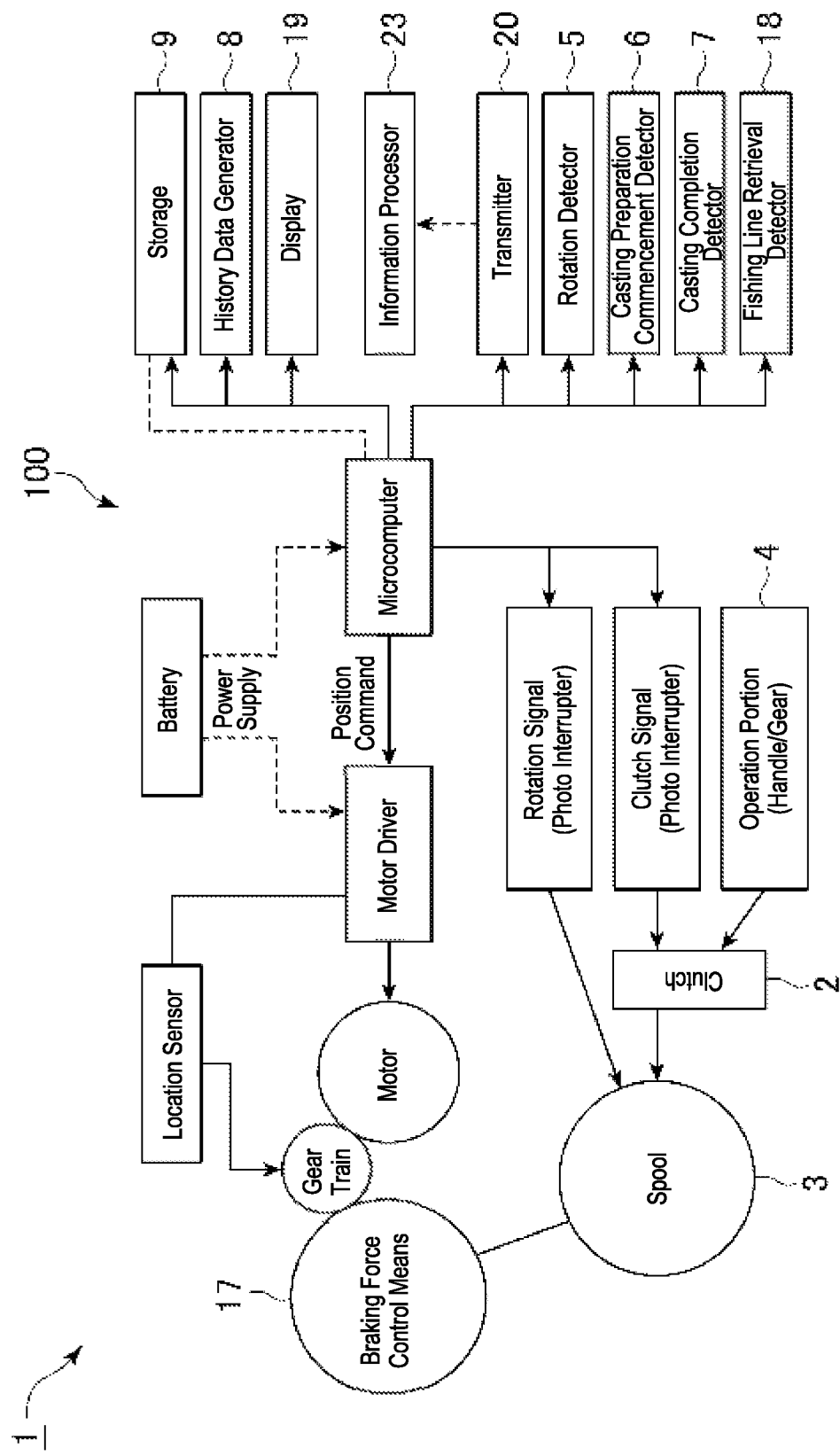
FIG. 1 shows a schematic view illustrating a fishing reel according to an example.

1 Fishing reel
2 Clutch
3 Spool
4 Operation portion
5 Rotation detector
6 Casting preparation commencement detector
7 Casting completion detector
8 History data generator
9 Storage
10 History data
11 Rotation amount of the spool
12 Temporal changes in the braking force to the spool
13 Casting distance of the fishing line
14 Maximum speed of the fishing line
15 Daily casting history
16 Reel usage history
17 Braking force control means
18 Fishing line retrieval detector
19 Output portion
20 Transmitter
21 Receiving means
22 Output portion
23 Information processing device
24 Display
100 History data management system

DETAILED DESCRIPTION

Hereinafter, examples of my locking devices will be described in detail with reference to the accompanying drawings. Components common in the plurality of drawings are denoted by the same reference numerals through the plurality of drawings. Each of the drawings is not necessarily scaled for convenience of explanation.

First, the fishing reel 1 will be described with reference to FIG. 1. As illustrated, the fishing reel 1 is configured to include: a spool 3 that winds a fishing line; an operation portion 4 that rotates the spool 3; a clutch 2 that switches from being power transmissible to power non-transmissible and vice versa between the operation portion and the spool; a rotation detector 5 that detects the rotation of the spool 3; a casting preparation commencement detector 6 that detects casting is ready; a casting completion detector 7 that detects the completion of casting; a history data generator 8 that generates history data from when casting is ready to when the casting is completed; and a storage 9 that stores the history data.

In the fishing reel 1 according to an example, making various history data upon casting and retrieval referable at any time allows the improvement of users' casting method and increase of the catch.

The spool 3 is rotatably and pivotally supported with respect to the fishing reel 1, and can wind the fishing line by forward rotation and release the wound fishing line by backward rotation. The operation portion 4 is configured, for example, as a handle, and can transmit the rotation operation of the user to the spool 3 through a transmission mechanism such as a gear so that the spool 3 can be rotated forward. Further, the operation portion 4 may be a combination of an operation member such as a lever, and a power source such as a motor.

The clutch 2 can be switched between ON state in which power is transmissible to the spool 3 and OFF state in which power is not transmitted. The spool 3 can be rotated in the forward direction by the operation member 3 when the clutch is turned on, and can be rotated in the forward and backward directions regardless of the state of the operation member 3 when the clutch is turned off (spool-free state).

The rotation detector 5 can be configured by a combination of a detection means such as a photo interrupter and a means to be detected such as a light shielding plate provided on the spool 3. This allows the rotation of the spool 3 to be converted into an electrical signal. The combination of the detection means and the means to be detected is not limited to the above example, and a well-known means such as a magnet and a magnetic sensor can also be used.

The casting preparation commencement detector 6, the casting completion detector 7, the history data generator 8, and the storage 9 are realized as programs in the microcomputer, the details of which will be described later. Further, a clutch state detection means that detects the state of the clutch 2 may also be provided. The state of the clutch can be converted into an electric signal by providing a means to be detected such as a magnet in part of the clutch 2, and detecting the position with a magnetic sensor or the like.

Figure 8:
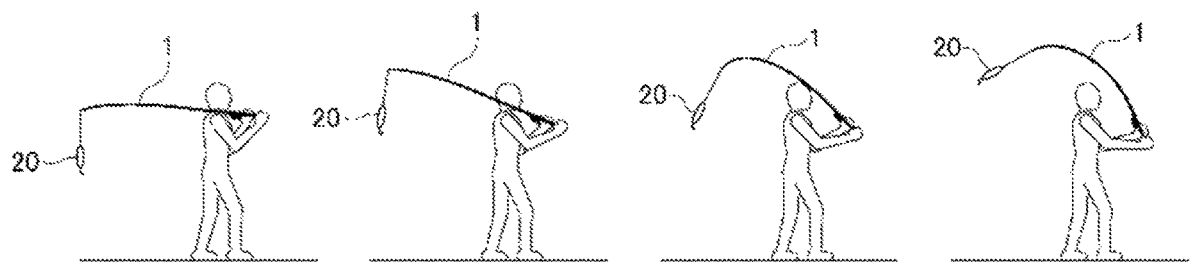
FIGS. 8 (a)-8 (g) show a diagram illustrating casting and retrieval procedures for fishing equipment such as a lure using a reel including the fishing reel according to an example.
Figure 8:
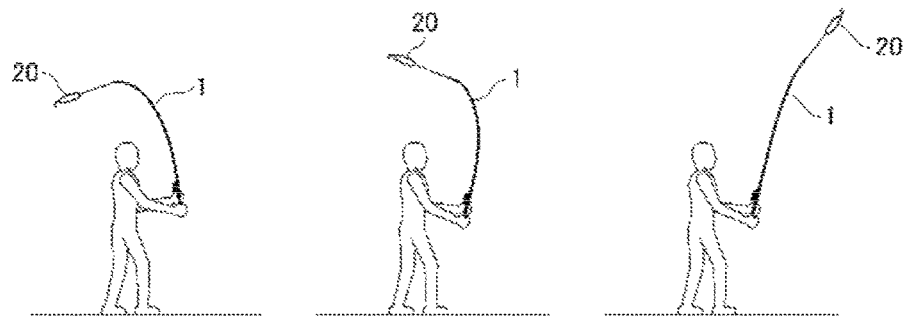

Next, an example of procedures for casting and retrieving fishing equipment such as a lure using a general reel including my reel will be described with reference to FIGS. 8 (a) to 8 (g). First, as shown in FIG. 8 (a), after a lure 20 is adjusted to a predetermined length from the rod tip by the operation member 3, the clutch 2 is turned off to make it in a spool-free state. At this time, the spool 3 is held by a thumb to prevent the fishing line from coming out due to the self-weight of the lure 20 or the like.

Then, as shown in FIGS. 8 (b) through 8 (d), an initial speed is given to the lure 20 by swinging the fishing rod. Next, as shown in FIG. 8 (e), when the thumb is released from the spool 3 at the appropriate speed and release direction of the lure, it is possible to cast the lure.

Further, as shown in FIG. 8 (g), the cast lure starts decelerating, receiving tension from the fishing line and air resistance. On the other hand, the spool 3 starts rotating backward due to the tension from the fishing line. When the release speed of the fishing line and the flying speed of the lure coincide, the rotation speed of the spool 3 reaches its maximum, and the fishing line loses tension. The lure then continues to decelerate due to air resistance and the like. At this time, if the spool 3 continues to rotate at a high speed due to inertia, the release speed of the fishing line exceeds the flying speed of the lure. As a result, the fishing line is excessively released, and becomes tangled in the reel. To avoid this, a predetermined braking force is applied to the spool 3 by a braking device 7.

Then, when the height of the lure falls sufficiently, the lure lands on the water. At this time, if the braking force is too large, the casting distance of the lure becomes shorter. If the braking force is too small, the line is tangled, and winding and releasing cannot be performed normally. The appropriate value of the braking force varies depending not only on the size of the lure and the length of the rod, but also on various influences such as the casting method, wind and other natural circumstances.

After the lure is submerged in the water to a prescribed depth after landing on the water, the lure is moved by operating an operation portion 3 (retrieved). This allows the lure to be taken by a fish. The catch varies depending on the winding speed at this time.

Figure 2:
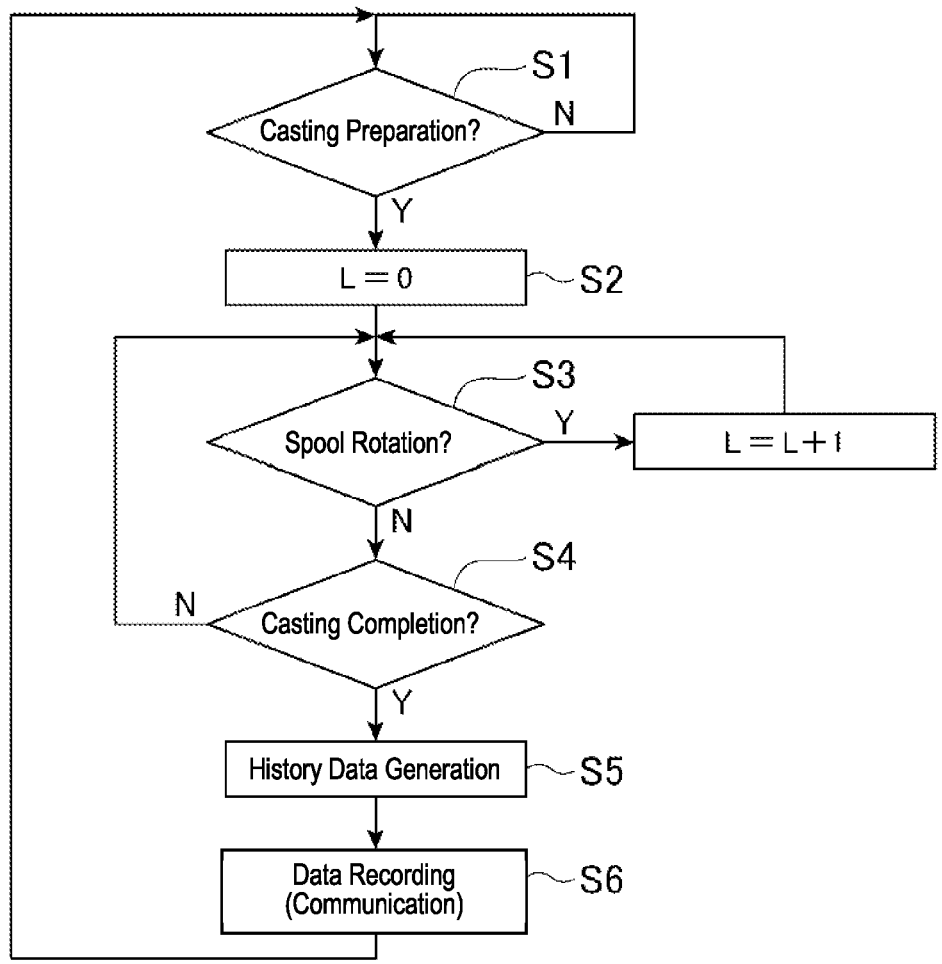
FIG. 2 shows a diagram illustrating an operation flow of the fishing reel according to an example.

Next, the operation flow of the fishing reel 1 will be described with reference to FIG. 2. As illustrated, first, in step S1, the casting preparation commencement detector 6 that detects that casting is ready detects whether or not the fishing reel 1 has commenced casting preparation. If the casting preparation has not commenced yet, the process returns to step S1.

When the casting preparation has commenced, the process moves on to step S2. In step S2, detection by the rotation detector 5 that detects the rotation of the spool 3 begins, and the distance is reset (L=0).

Next, in step S3, the rotation detector 5 that detects the rotation of the spool 3 confirms whether or not the rotation of the spool 3 is detected. If the rotation is detected, the measured value is increased by a predetermined distance (L=L+1), and then the process returns to step S3. The distance L may be a rotation amount of the spool 3 or an amount of released fishing line obtained by correcting the radius change of the spool 3.

In step S3, when the rotation of the spool 3 is not detected by the rotation detector 5 that detects the rotation of the spool 3, the process moves on to the next step. In step S4, the casting completion detector 7 that detects the completion of casting detects whether or not the casting is completed. If the casting preparation has not commenced yet, the process returns to step S3.

Upon completion of casting, the process moves on to step S5. In step S5, history data is generated by the history data generator 8 that generates history data from when casting is ready to when the casting is completed, and the process moves on to the next step.

In step S6, the history data generated in step S5 is stored in the storage 9, or the generated history data is transmitted to the outside by a communication processor described later. This allows the transmission of information to an external device such as a PC, smart phone and other reel, as well as the inspection and recording of data.

Figure 9:
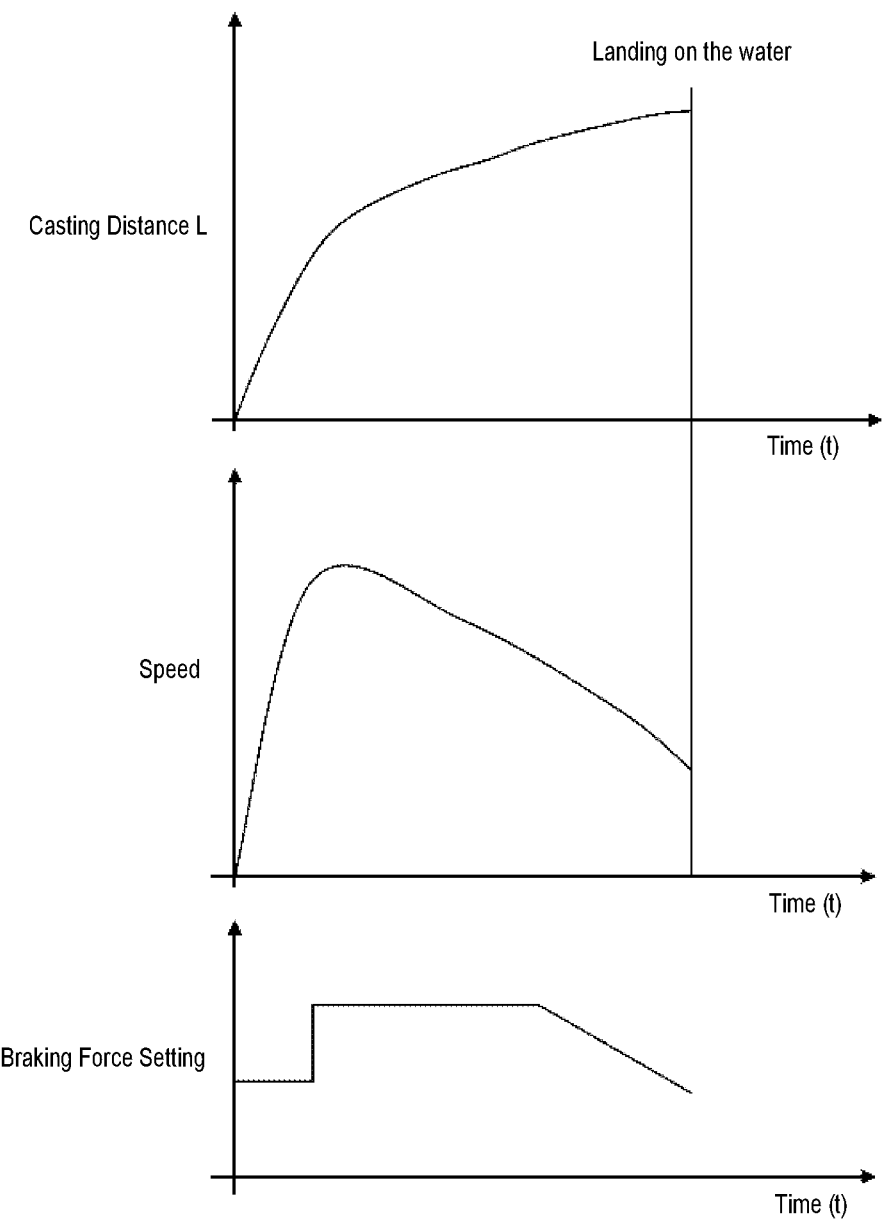
FIG. 9 shows a diagram illustrating the history data for the fishing reel according to an example.

The history data will be described. History data, as, for example, shown in FIG. 9, may be a change in the distance L for each predetermined time, or only the final flight distance L. It may also include a change of speed of the spool obtained by time differentiation of L, temporal changes in the braking force, the maximum speed of the fishing line, and the maximum rotation speed of the spool. Further, daily casting history may be recorded by totaling the number of times of casting on that day, or the total casting data of the reel may also be recorded.

Making various history data upon casting and retrieval referable at any time allows the improvement of users' casting method and increase of the catch. That is, understanding the relationship between the casting distance and the braking force setting makes it easier to find the best setting of the braking force. In addition, recording the number of times of casting and the casting distance may lead to the improvement of the casting method.

Figure 3:
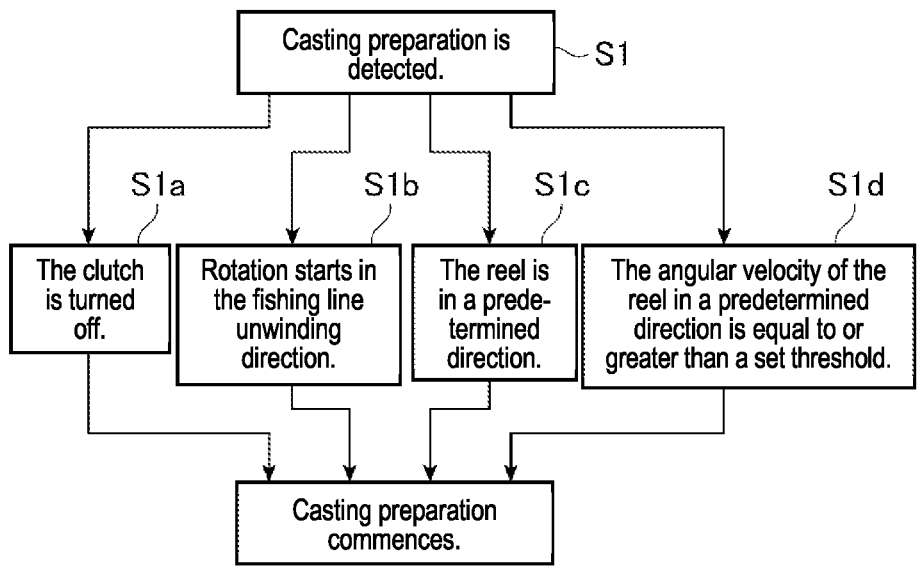
FIG. 3 shows a diagram illustrating a state at the time of the commencement of casting preparation of the fishing reel according to an example.

Next, a state at the time of the commencement of casting preparation of the fishing reel 1 according to an example will be described with reference to FIG. 3. The casting preparation commencement detector 6 may be configured to detect the commencement of casting preparation in the abovementioned step S1, more specifically, when the clutch 2 is turned off (S1a), when the spool 3 starts rotating in a fishing line winding direction from a standstill (S1b), when the reel is in a predetermined direction (S1c), when the angular velocity of the reel in a predetermined direction is equal to or greater than a set threshold (S1d), or when an input device such as a button is provided on the reel, and the user operates the input device when he/she wants to commence casting preparation (S1e). As described above, the casting preparation commencement detector 6 can accurately detect the commencement of casting preparation by detecting any of the above states.

Figure 4:
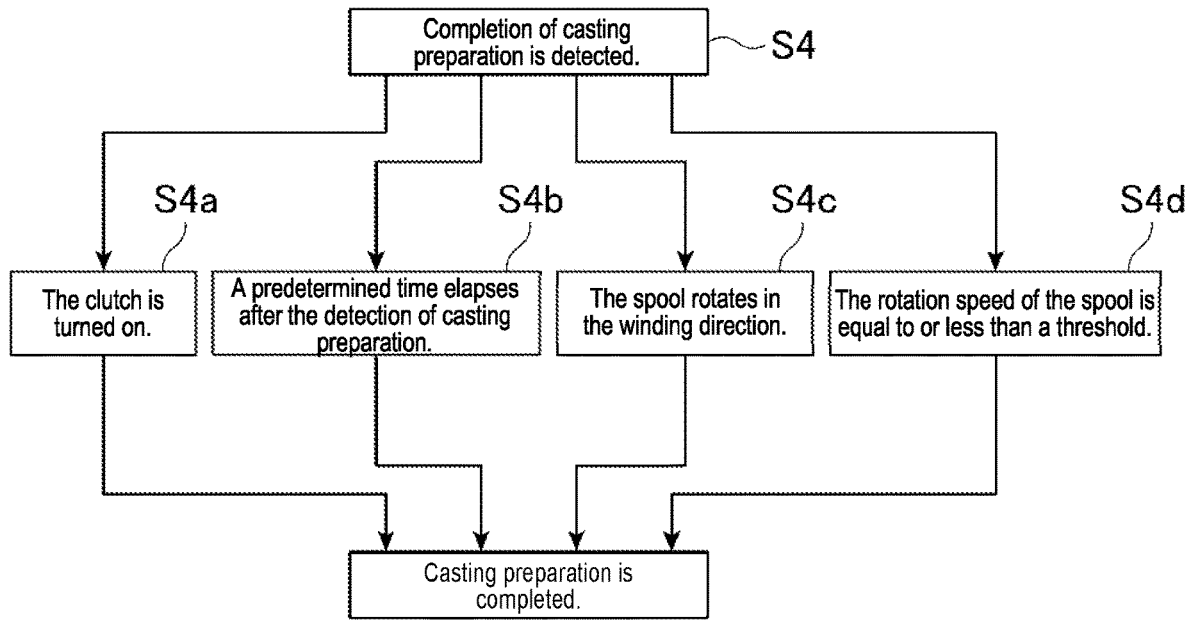
FIG. 4 shows a diagram illustrating a state at the time of the completion of casting of the fishing reel according to an example.

Next, a state at the time of the completion of casting of the fishing reel 1 will be described with reference to FIG. 4. The casting completion detector 7 may be configured to detect the completion of casting when the clutch 2 is turned on (S4a), when a predetermined time elapses after the detection of the commencement of casting preparation (S4b), when the rotation of the spool 3 is in a winding direction (S4c), when the rotation speed of the spool is equal to or less than a threshold (S4d), or when an input device such as a button is provided on the reel, and the user operates the input device when judging that casting is completed (S4e). As described above, the casting completion detector 7 can accurately detect the completion of casting by detecting any of the above states.

Figure 5:
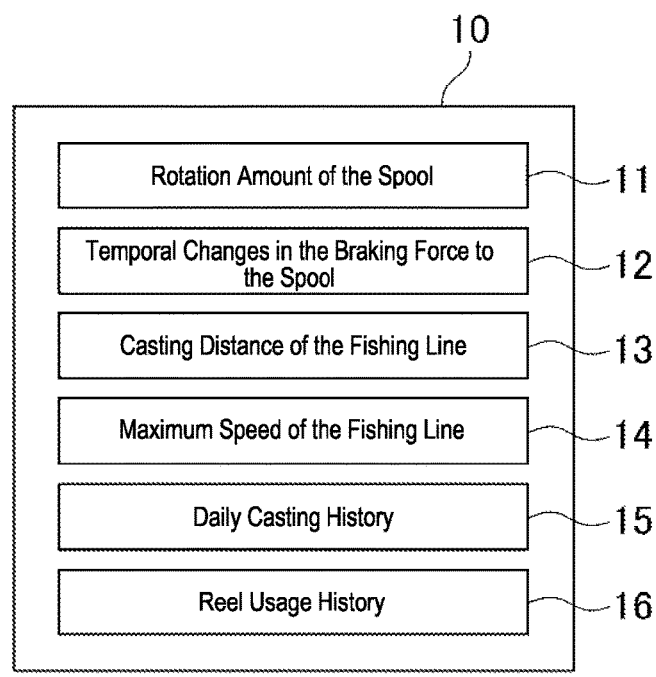
FIG. 5 shows a diagram illustrating the history data for the fishing reel according to an example.

Next, the history data 10 generated by the history data generator 8 of the fishing reel 1 will be described with reference to FIG. 5. The history data 10 may be configured to include at least one of a rotation amount 11 of the spool, a temporal change 12 in the braking force to the spool, a casting distance 13 of the fishing line, a maximum speed 14 of the fishing line, a daily casting history 15, and a usage history 16 of the reel.

Making such history data referable at any time allows the improvement of users' casting method and increase of the catch.

The daily casting history 15 may be configured to include at least one of the number of times of casting, the total casting distance, and the maximum casting distance.

The usage history 16 of the reel may be configured to include at least one of the number of times of casting, the total casting distance, and the total number of rotations upon casting.

The fishing reel 1 includes a braking force control means 17 for changing the braking force to the spool 3 over time, wherein the history data 10 is configured to include temporal changes in the braking force.

With further reference to FIG. 1, the fishing reel 1 will be described. As illustrated, the fishing reel 1 is configured to include: the spool 3 that winds a fishing line; the operation portion 4 that rotates the spool 3; the rotation detector 5 that detects the rotation of the spool 3; the casting completion detector 7 that detects the completion of casting; a fishing line retrieval detector 18 that detects the retrieval of the fishing line; the history data generator 8 that generates history data from the completion of casting to the retrieval of the fishing line, and the storage 9 that stores the history data.

Making various history data upon retrieval referable at any time allows the improvement of users' casting method and increase of the catch.

Figure 6:
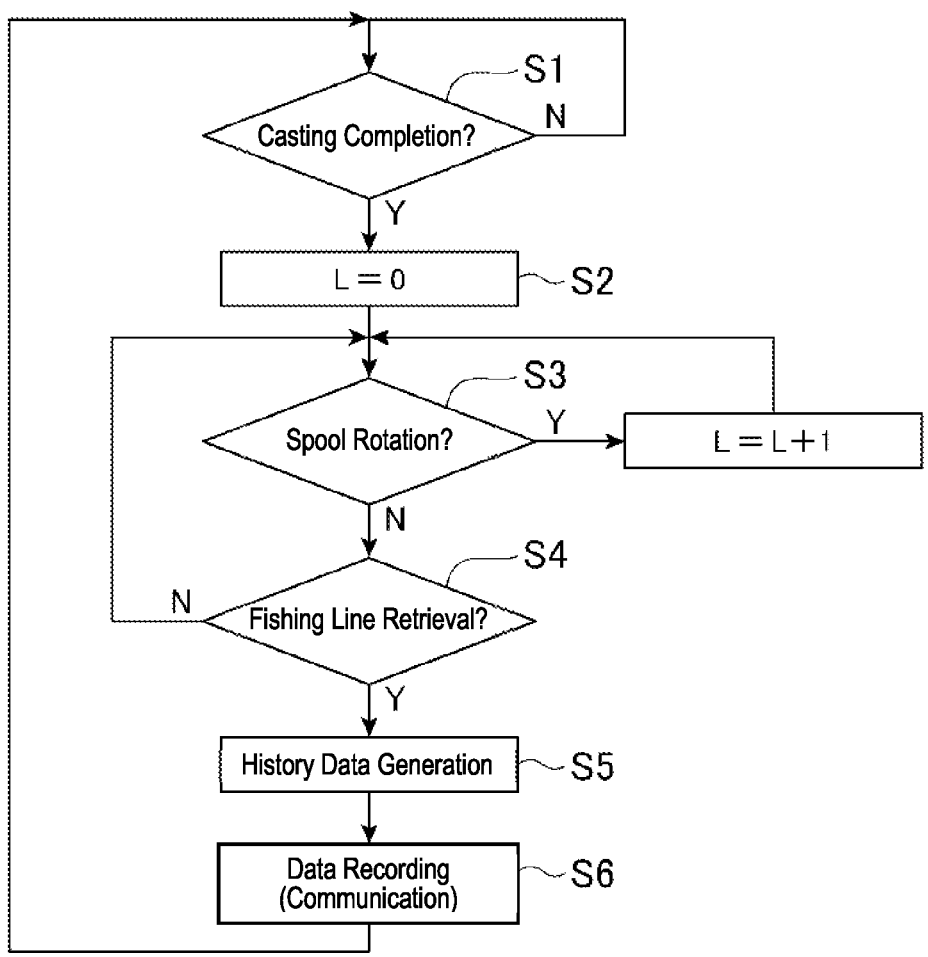
FIG. 6 shows a diagram illustrating an operation flow of the fishing reel according to an example.

Next, the operation flow of the fishing reel 1 according to an example will be described with reference to FIG. 6. As illustrated, first, in step S1, the casting completion detector 7 that detects the completion of casting detects whether or not the fishing reel 1 has completed casting. If the casting is uncompleted, the process returns to step S1.

When the casting is completed, the process moves on to step S2. In step S2, the detection by the rotation detector 5 that detects the rotation of the spool 3 begins (L=Lmax).

Next, in step S3, the rotation detector 5 that detects the rotation of the spool 3 confirms whether or not the rotation of the spool is detected. If the rotation is detected, the line length is increased or decreased by a predetermined distance in accordance with the rotation direction (L=L±1), and then the process returns to step S3.

In step S3, when the rotation of the spool 3 is not detected by the rotation detector 5 that detects the rotation of the spool 3, the process moves on to the next step. In step S4, the fishing line retrieval detector 18 that detects the retrieval of the fishing line detects whether or not the fishing line is retrieved. If the fishing line is not retrieved, the process returns to step S3.

If the fishing line is retrieved, the process moves on to step S5. In step S5, the history data generator 8 that generates history data from the completion of casting to the retrieval of the fishing line generates history data, and the process moves on to the next step. Conditions for detecting the retrieval of the fishing line include, for example, that the measured line length L becomes a predetermined value or less, and that the clutch is turned off to prepare the next casting.

In step S6, the history data generated in step S5 is stored in the storage 9, or the generated history data is transmitted to the outside by a communication processor described later.

Making various history data upon retrieval referable at any time allows the improvement of users' retrieval method and increase of the catch.

Figure 7:
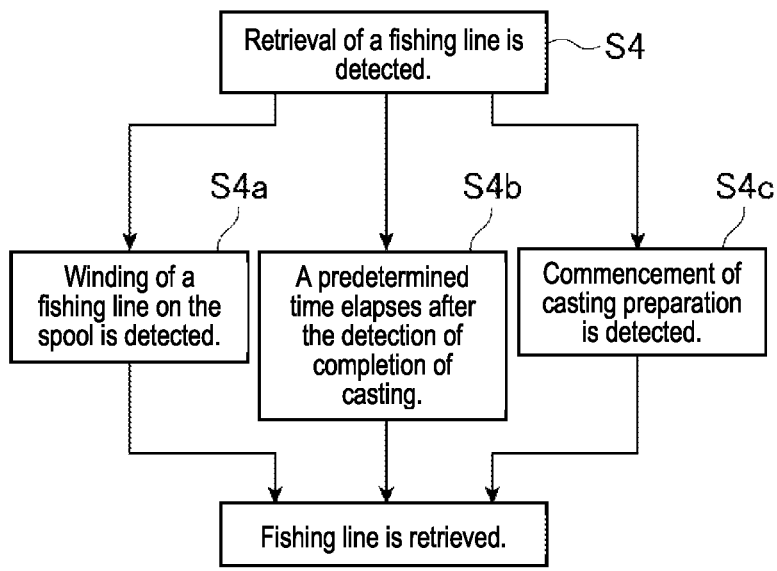
FIG. 7 shows a diagram illustrating a state at the time of the retrieval the fishing line of the fishing reel according to an example.

Next, a state at the time of the retrieval of the fishing line of the fishing reel 1 according to an example will be described with reference to FIG. 7. The fishing line retrieval detector 18 may be configured to detect the retrieval of the fishing line when the winding of the fishing line on the spool is completed (S4a), when a predetermined time elapses after the detection of the completion of casting (S4b), or when the commencement of casting preparation is detected (S4c). As described above, the fishing line retrieval detector 18 can accurately detect the state of the fishing line retrieval by detecting any of the above states.

As shown in FIG. 1, the fishing reel 1 is configured to include a display (displaying unit or displaying portion) such as LED and LCD that displays the history data 10, or an output portion 19 that is realized by a notification portion or the like for notifying by voice data, notification sound, vibration or the like. Further, the fishing reel 1 is configured to include a transmitter 20 that transmits the history data 10.

A history data management system 100 according to an example includes any of the abovementioned fishing reels 1, a receiving means 21 that receives the history data, and an information processing device 23 having an output portion 22 that outputs the history data.

In the history data management system 100, the information processing device 23 may be configured to include a display 24 that displays the history data 10. Further, in the history data management system 100, a portable device including, but not limited to, a portable terminal can be used as the information processing device 23.

The dimension, material and arrangement of each component described herein are not limited to those explicitly described in the examples, and each component can be modified to have any dimension, material and arrangement that may be within the scope of this disclosure. Further, components not explicitly described herein may be added to the described examples, and some of the components described in each example may also be omitted.

What is claimed is:

1. A fishing reel comprising:
    a spool that winds a fishing line;
    an operation portion that rotates the spool;
    a rotation detector that detects the rotation of the spool;
    a casting completion detector that detects the completion of casting;
    a fishing line retrieval detector that detects the retrieval of the fishing line;
    a history data generator that generates history data from the completion of casting to the retrieval of the fishing line; and
    a storage that stores the history data.

2. The fishing reel according to claim 1, further comprising:
    a clutch that switches from being power transmissible to power non-transmissible and vice versa between the operation portion and the spool; and
    a casting preparation commencement detector that detects casting is ready; wherein
    the history data generator further generates history data from when casting is ready to when the casting is completed.

3. The fishing reel according to claim 2, wherein the casting preparation commencement detector detects commencement of casting preparation when: the clutch is turned off, the spool starts rotating in the fishing line unwinding direction from a standstill, the reel is in a predetermined direction, the angular velocity in a predetermined direction of the reel is equal to or greater than a set threshold, or an input means is operated.

4. The fishing reel according to claim 2, wherein the casting completion detector detects completion of casting when: the clutch is turned on, a predetermined time elapses after the detection of the commencement of casting preparation, the rotation of the spool is in a winding direction, the rotation speed of the spool is equal to or less than a threshold, or an input means is operated.

5. The fishing reel according to claim 2, wherein the history data includes at least one of rotation amount of the spool, temporal changes in braking force to the spool, casting distance of the fishing line, maximum speed of the fishing line, daily casting history, and reel usage history.

6. The fishing reel according to claim 5, wherein the daily casting history includes at least one of number of times of casting, total casting distance, and maximum casting distance.

7. The fishing reel according to claim 5, wherein the reel usage history includes at least one of number of times of casting, total casting distance, and total number of rotations upon casting.

8. The fishing reel according to claim 2, comprising a braking force controller that changes the braking force to the spool over time, wherein the history data includes temporal changes in the braking force.

9. The fishing reel according to claim 2, further comprising an output portion that outputs the history data.

10. The fishing reel according to claim 2, further comprising a transmitter that transmits the history data.

11. A history data management system comprising: the fishing reel according to claim 2; a receiving means that receives the history data; and an information processing device having an output portion that outputs the history data.

12. The history data management system according to claim 11, wherein the information processing device includes a display that displays the history data.

13. The history data management system according to claim 11, wherein the information processing device is a portable device.

14. The fishing reel according to claim 1, wherein the fishing line retrieval detector detects retrieval of the fishing line when: winding of the fishing line on the spool is completed, a predetermined time elapses after the detection of the completion of casting, or the commencement of casting preparation is detected.

* * * * *